(No Model.)
F. A. WILLIAMS.
DRINKING FOUNTAIN FOR POULTRY, &c.
No. 591,183. Patented Oct. 5, 1897.
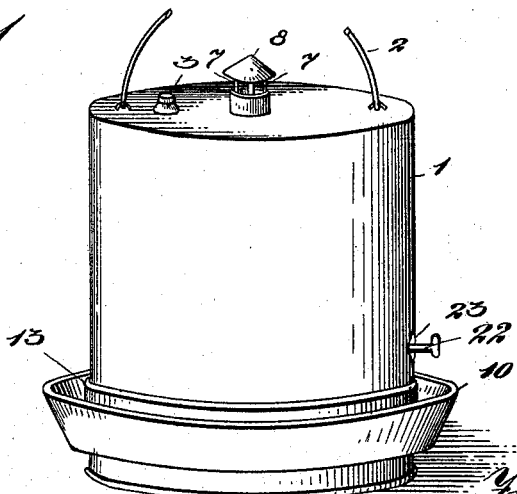
Fig. 1
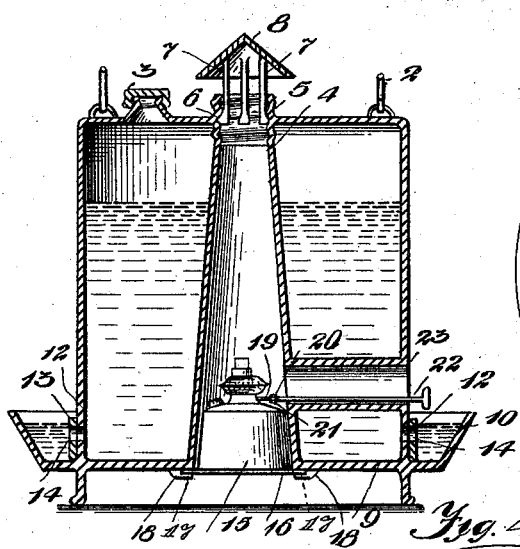
Fig. 2
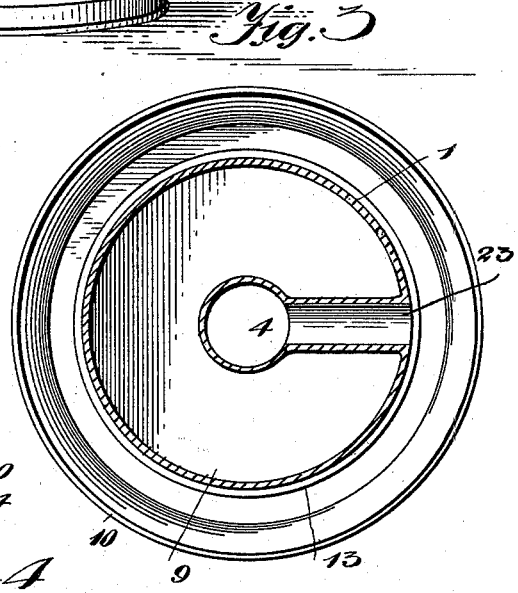
Fig. 3
Fig. 4
Witnesses
Edmund A. Skeans
Wm. F. Doyle
Inventor
Francis A. Williams
By H. B. Willson
Attorney

UNITED STATES PATENT OFFICE.

FRANCIS ALBERT WILLIAMS, OF JACKSONVILLE, FLORIDA.

DRINKING-FOUNTAIN FOR POULTRY, &c.

SPECIFICATION forming part of Letters Patent No. 591,183, dated October 5, 1897.

Application filed November 28, 1896. Serial No. 613,775. (No model.)

*To all whom it may concern:*

Be it known that I, FRANCIS ALBERT WILLIAMS, a citizen of the United States, residing at Jacksonville, in the county of Duval and State of Florida, have invented certain new and useful Improvements in Drinking-Fountains for Poultry, &c.; and I do declare the following to be a full, clear, and exact description of the invention, such as will enable others skilled in the art to which it appertains to make and use the same.

My invention has relation to improvements in drinking-fountains for poultry and the like, and the object is to provide a device for keeping the water pure and clean at all times, and in the winter season to warm it or heat it to such a degree as will prevent its freezing and at the same time make it more palatable and healthy for the fowls.

To these ends the novelty consists in the construction, combination, and arrangement of the same, as will be hereinafter more fully described, and particularly pointed out in the claim.

In the accompanying drawings the same reference-numerals indicate the same parts of the invention.

Figure 1 is a perspective view of a drinking-fountain for poultry embodying my invention. Fig. 2 is a vertical sectional elevation of the same. Fig. 3 is a horizontal section on the line of the top of the drinking-pan, and Fig. 4 is a similar view on the line of the water-outlet orifices.

1 represents a cylindrical vessel, which may be of any suitable size and shape, the top of which is provided with a hinged bail 2 and a removable air-tight screw-cap 3.

4 represents a central conical flue the inside of the upper end of which is formed with a corrugated spiral recess 5, which receives the laterally-projecting teeth 6 6 of the depending prongs 7 7, secured to the under side of the adjustable hood 8, which may be turned to the right or the left to increase or diminish the draft in the upper end of said flue 4. As will be seen, this hood may also be removed for conveniently cleaning the flue.

9 represents the cylindrical bottom of the vessel 1, and it has a projecting flange 10, which forms a pan or receptacle for the drinking-water between it and the wall of the vessel 1.

12 12 represent a series of lateral orifices in the lower end of the vessel 1 below the upper edge of the flange 10, and by a well-known hydrostatic principle the water in the airtight vessel 1 will flow out of the orifices 12 into the pan until the level of the water in the pan rises above said orifices and seals them, and as fast as the water in the pan is consumed a fresh supply will be automatically fed from the vessel 1 to maintain the contents in the pan at a standard level.

13 represents an annular ring which fits snugly around the lower edge of the vessel 1, and it is provided with a series of orifices 14 14, which register with the orifices 12 12. By moving said ring horizontally the orifices 12 12 are closed, the screw-cap 3 in the top of the vessel 1 may be removed, and the vessel filled, as occasion requires. When the cap is replaced and the ring 13 restored to its former position, the fountain is again placed in automatic operation, as before.

15 represents an ordinary oil-lamp provided with a projecting flange 16 on its bottom, which has semicircular recesses 17 17 to receive the lugs 18 18 on the bottom 9 of the vessel 1 to detachably hold said lamp in place.

19 represents the wick-regulating shaft, which is provided at its outer end with a square head 20 to receive the socket 21 of the removable shaft 22, which extends through a transverse tube 23 in the vessel 1 in line with the lamp-flame, and by means of this tube 23 and the shaft 22 the flame may be both seen and regulated.

In practice I prefer to make the fountain of sheet metal, but of course pottery-ware or other suitable material may be employed, and although I have specifically described the construction and relative arrangement of the several elements of my invention I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A drinking-fountain for poultry, comprising the vessel 1, having the orifices 12, and provided with the central conical flue 4, having an internal spiral recess 5, formed in its upper end, the removable screw-cap 3, the transverse fixed tube 23, and the bottom 9, formed with the projecting flange 10, in combination with the removable adjustable hood 8, having the depending prongs 7 7 formed with laterally-projecting teeth 6 6, the removable lamp 15, the shaft 22 detachably secured to said lamp, and the annular ring 13, having orifices 14 14, as and for the purpose set forth.

In testimony whereof I hereunto affix my signature in presence of two witnesses.

FRANCIS ALBERT WILLIAMS.

Witnesses:
H. WILLIAMS,
W. B. CLARKSON.